United States Patent
Mack

(10) Patent No.: US 8,070,168 B2
(45) Date of Patent: Dec. 6, 2011

(54) DRILL CHUCK

(75) Inventor: Hans-Dieter Mack, Sontheim (DE)

(73) Assignee: Roehm GmbH, Sontheim (DE)

( * ) Notice: Subject to any disclaimer, the term of this patent is extended or adjusted under 35 U.S.C. 154(b) by 1031 days.

(21) Appl. No.: 11/887,891

(22) PCT Filed: Feb. 18, 2006

(86) PCT No.: PCT/DE2006/000297
§ 371 (c)(1),
(2), (4) Date: Oct. 4, 2007

(87) PCT Pub. No.: WO2006/111114
PCT Pub. Date: Oct. 26, 2006

(65) Prior Publication Data
US 2009/0058019 A1    Mar. 5, 2009

(30) Foreign Application Priority Data

Apr. 20, 2005  (DE) .......................... 10 2005 018 392
Oct. 7, 2005   (EP) ..................................... 05021864

(51) Int. Cl.
*B23B 31/16*     (2006.01)

(52) U.S. Cl. ............ 279/60; 279/125; 279/140; 279/902

(58) Field of Classification Search .............. 279/60–62, 279/125, 140, 902; *B23B 31/16*
See application file for complete search history.

(56) References Cited

U.S. PATENT DOCUMENTS

| 4,302,021 | A | * | 11/1981 | Rohm | 279/60 |
| 4,398,733 | A | * | 8/1983 | Mosley, Jr. | 279/127 |
| 5,031,925 | A |   | 7/1991 | Tatsu | |
| 5,232,230 | A | * | 8/1993 | Lin | 279/62 |
| 5,499,830 | A | * | 3/1996 | Schnizler | 279/62 |
| 5,765,839 | A |   | 6/1998 | Rohm | |
| 6,517,088 | B1 | * | 2/2003 | Rohm | 279/62 |
| 6,550,785 | B2 | * | 4/2003 | Rohm | 279/62 |
| 7,156,402 | B2 |   | 1/2007 | Mack | |
| 7,185,895 | B2 | * | 3/2007 | Cachod et al. | 279/62 |
| 7,503,565 | B2 | * | 3/2009 | Rohm | 279/60 |
| 7,726,663 | B2 | * | 6/2010 | Mack et al. | 279/60 |
| 7,841,601 | B2 | * | 11/2010 | Mack | 279/60 |
| 2006/0284386 | A1 | * | 12/2006 | Mack | 279/60 |
| 2007/0235951 | A1 | * | 10/2007 | Mack | 279/60 |
| 2008/0217869 | A1 | * | 9/2008 | Mack | 279/62 |
| 2010/0207336 | A1 | * | 8/2010 | Mack | 279/60 |

\* cited by examiner

*Primary Examiner* — Eric A Gates
(74) *Attorney, Agent, or Firm* — Andrew Wilford

(57) ABSTRACT

The invention relates to a clamping drill chuck including a chuck body (1), a clamping cone (2) that can be rotated coaxially in relation to the chuck body (1) and is axially supported on a jaw holder (3) mounted on the chuck body (1) and in which clamping jaws (4) are guided in guiding slits, said clamping jaws being adjustable, by means of the jaw holder (3), for the clamping and releasing action by a relative rotation between the chuck body (1) and the clamping cone (2). The drill chuck also includes a locking device (9) provided with a toothed ring (6) which is coaxial to the chick axle (5), in addition to a latch mechanism (8) which is mounted on the jaw holder (3) and engages in the toothed ring (6) when subjected to the force of a spring (7).

23 Claims, 15 Drawing Sheets

DRILL CHUCK

CROSS REFERENCE TO RELATED APPLICATIONS

This application is the US national phase of PCT application PCT/DE2006/000297, filed 18 Feb. 2006, published 26 Oct. 2006 as WO 2006/111114, and claiming the priority of German patent application 102005018392.1 itself filed 20 Apr. 2005 and European patent application 05021864.3 itself filed 7 Oct. 2005, whose entire disclosures are herewith incorporated by reference.

FIELD OF THE INVENTION

The invention relates to a self-tightening drill chuck with a chuck body, a tightening sleeve that can rotate coaxially to the chuck body, axially supported on a jaw holder mounted on the chuck body, in which holding jaws guided in guide slots which can be moved for tightening and loosening by a relative rotation between the chuck body and the tightening sleeve with the jaw holder, and with a locking device having a ring of gear teeth coaxial to the chuck axis on the one hand and having a detent pawl that is mounted on the jaw holder and engages under the force of a spring into the ring of gear teeth on the other hand, which locking device prevents the chuck body and the detent pawl from rotating in the direction loosening the holding jaws when the detent pawl is engaged in the ring of gear teeth but does not affect rotation in the tightening direction.

BACKGROUND OF THE INVENTION

Such a drill chuck is known from EP 0 017 748 A1 [4,302,021] and has proven itself in practice, especially also for professional use. However, it has been determined in the case of this drill chuck that when it is used problems can occur with the manipulation of the loosening ring and the tightening sleeve that are precisely coordinated with one another and that call into question the effective use of the locking device. In order to open the drill chuck the loosening ring must namely be rotated into the position in which the detent pawl moves out of the ring of gear teeth, whereupon the tightening sleeve can then be rotated in the other rotational sense for opening the holding jaws. In order to close the drill chuck the tightening sleeve must be rotated in the opposite direction and subsequently the loosening ring must again be shifted in the direction opposite the tightening sleeve, to lock in the set clamping force.

OBJECT OF THE INVENTION

The invention therefore has the object of designing a self-tightening drill chuck of the above-cited type in such a manner as to simplify its operation.

SUMMARY OF THE INVENTION

This object is attained by a drill chuck of the above-described type in that a stop is formed on the jaw holder and a counterstop is formed on the tightening sleeve for a defined limiting of a relative ability of the tightening sleeve to rotate relative to the jaw holder between a first angular end position corresponding to the engaged state of the detent pawl and a second angular end position corresponding to the disengaged state, and in that a retaining device with a locking seat associated with the first angular position and with a locking seat associated with the second angular position is arranged between the jaw holder and the tightening sleeve, which retaining device allows rotation of the tightening sleeve relative to the jaw holder at least in the rotational sense of the tightening sleeve that corresponds to tightening, only when a predetermined tightening force has been achieved.

Such a drill chuck is distinguished by the great advantage that a separate loosening ring and tightening casing can be eliminated so that the loosening ring does not have to be manipulated separately from the tightening casing. This is achieved by the suitable limited rotation of the jaw holder relative to the tightening sleeve, that is used to switch the position of the detent pawl. As a result, it turns out that only the tightening sleeve has to be grasped by the user and rotated in the direction corresponding to tightening or loosening, as a result of which the detent pawl automatically assumes the desired operating state without further intervention by the user. In order to avoid permanent ratcheting of the detent pawl over the ring of gear teeth when the drill chuck is tightened, a retaining device is provided that does not allow rotation of the tightening sleeve relative to the jaw holder until a predetermined tightening force has been achieved, namely, as a rule when the holding jaws come to rest on the shaft of the tool to be tightened and the torque resistance sharply rises as a consequence to force a shift between the two locking seats on a continued rotation of the tightening sleeve.

In order to achieve reliable shifting of the detent pawl and therewith high operating safety, the invention provides that the tightening sleeve is formed with a cam for moving the detent pawl out of the position engaged in the ring of gear teeth into the disengaged position on rotation of the tightening sleeve in the rotational sense corresponding to loosening of the holding jaws. This design ensures that pivoting of the detent pawl is coordinated with the rotation of the tightening sleeve.

Furthermore, it has proven to be advantageous if the detent pawl is made as a two-armed lever with at least a first lever arm having a locking tooth and a second lever arm for engaging the cam since in this manner the distance between the cam and the ring of gear teeth can be bridged in a simple manner and a sufficient pressing of the locking tooth against the ring of gear teeth is ensured under the action of the lever.

This embodiment offers the possibility that the spring bears on the first lever arm having the locking tooth in order to utilize the length of the lever arm in this manner and to optimize the effect of the force of the spring in the direction of the ring of gear teeth.

Furthermore, it is quite particularly preferred if the spring is pivoted by a cam in the disengaged position of the detent pawl out of the position bearing on it, since this ensures that no ratcheting or rattling noise occurs, as would be the case if, e.g., a compressed pressure spring permanently produced an action of force in the direction of the ring of gear teeth.

Furthermore, there is also the possibility that the tightening sleeve is made in two parts with a loosening ring serving to shift the detent pawl, which embodiment has the option of independent moving the loosening ring opposite the tightening sleeve.

The ring of gear teeth is formed on the chuck body, in particular to be able to make the manufacture and mounting simple. The fact that the detent pawl and the spring are made in one piece also serves to further simplify the mounting. There is basically also the possibility that the spring is supported on the tightening sleeve.

However, there is basically also the possibility that the ring of gear teeth is formed on a tightening sleeve and that the cam is then associated with the jaw holder.

The fact that the tightening sleeve is in two parts creates the possibility of selecting the material for the components independently, so that the loosening ring consists or can consist of a metal or alternatively of a material capable of being injection-molded, preferably plastic.

This possibility of selection is also present for the tightening sleeve, that therefore is made of metal or of a material capable of being injection-molded, preferably plastic.

However, the two-part construction, which is advantageous for the selection of the material, must retain the ability to function, so that the tightening sleeve and the loosening ring are positively connected in the circumferential direction in a torque-transferring manner in that a groove-key connection acting in the circumferential direction is formed between the loosening ring and the tightening sleeve.

The two-part construction can also be used for the jaw holder, that is constructed in two parts with a holding sleeve having the guide slots and with a stop part having the stop, which holding sleeve and which stop part are positively connected in a torque-transferring manner because a groove-key connection acting in the circumferential direction is formed between the holding sleeve and the stop part.

There is the possibility, in particular in order to shorten of the overall length of the drill chuck, that a holding ring is mounted on the axial rear end of the chuck body facing away from the holding jaws in such a manner that it is adapted to rotate with it in unison, which holding ring has a ring collar facing axially forward on which the ring of gear teeth is formed, therefore, a dual function is assigned to the holding ring and the fact that it is associated with the chuck body in such a manner that it can rotate in unison with it is utilized to place the ring of gear teeth spatially corrected from other components.

There is the possibility here that the ring of gear teeth is formed on the inner circumferential surface of the ring collar and that a conical collar is formed on the axial rear end of the tightening sleeve, which conical collar is located inside the ring collar and has an opening so that the detent pawl can extend through it. Therefore, the engagement direction of the detent pawl is adapted in order to achieve a sufficient contact length between the holding ring and the chuck body.

It is advantageous if the conical collar is formed with the locking seats of the retaining device, that is, if the retaining device and the detent device act in one plane.

The retaining device can be realized in an especially simple and therefore preferred manner if a locking spring arranged on the jaw holder is associated with the retaining device for engagement into the locking seats.

A higher degree of reliability of the retaining device is achieved if the locking spring is provided in duplicate so that this is realized especially if high loads and vibrations can occur in high-power drills.

BRIEF DESCRIPTION OF THE DRAWING

The invention is explained in detail in the following using illustrated embodiments shown in the drawings.

DETAILED DESCRIPTION

Figure 1:
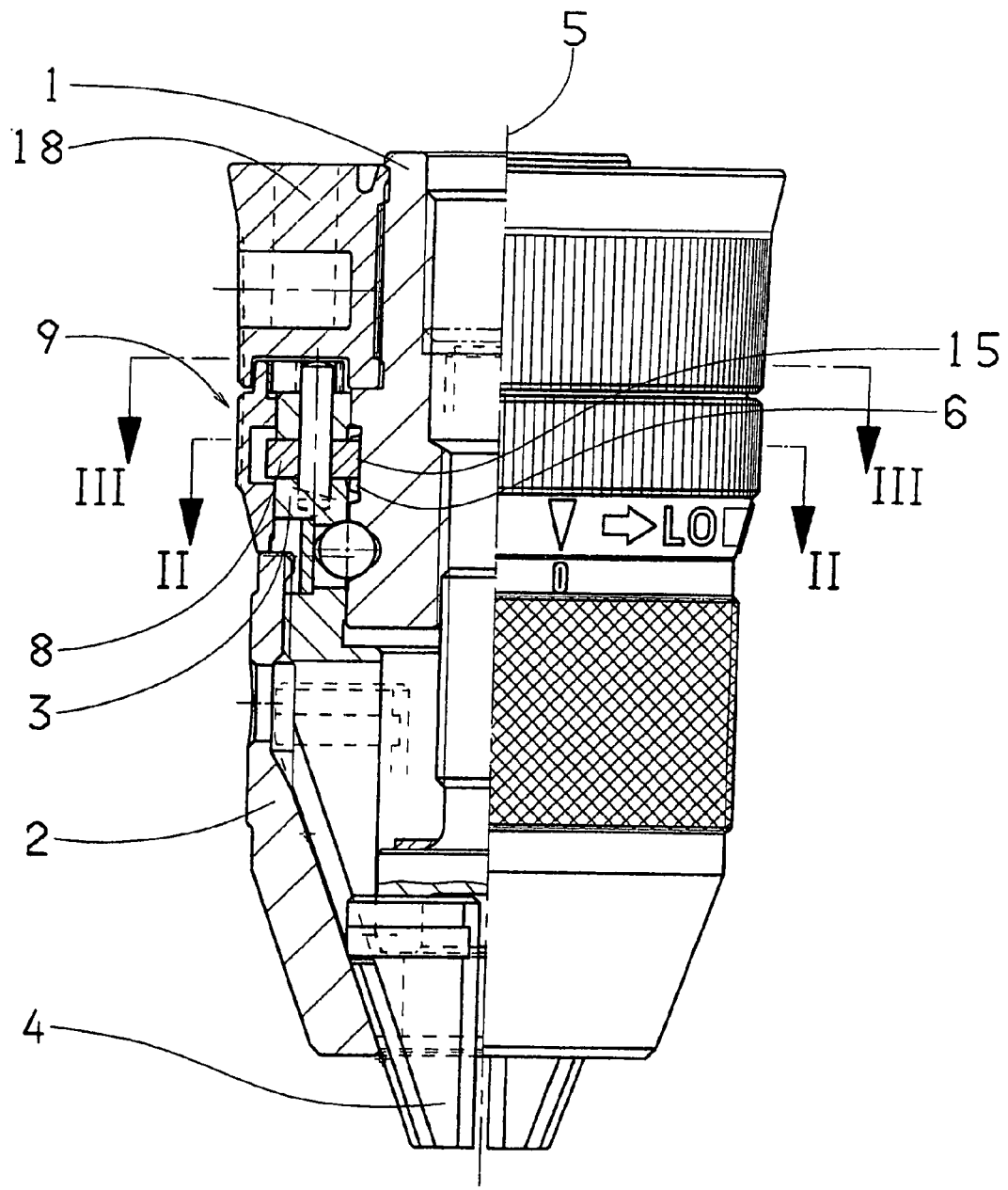
FIG. 1 is a self-tightening drill chuck in accordance with the invention, shown on the left in axial section, on the right in a side view.

In the drawings FIG. 1 shows a self-tightening drill chuck comprising a chuck body 1 and a tightening sleeve 2 that can rotate coaxially to chuck body 1 and that is axially supported on a jaw holder 3 mounted on chuck body 1. Holding jaws 4 are guided in guide slots in a jaw holder 3 and can be moved for tightening and loosening by a relative rotation between the chuck body 1 and the tightening sleeve 2 with the jaw holder 3. The drill chuck furthermore comprises a locking device 9 having a ring of gear teeth 6 coaxial to the chuck axis 5 on the one hand and having a detent pawl 8 that is mounted on the jaw holder 3 and engages under the force of a spring 7 into the ring of gear teeth 6 on the other hand in order to lock the chuck body 1 and detent pawl 8 against relative rotation in the loosening direction of the holding jaws 4 when the detent pawl 8 is engaged in the ring of gear teeth 6 but the locking device 9 does not prevent rotation in the tightening direction. FIG. 1 shows an embodiment in which the ring of gear teeth 6 is formed on the chuck body 1.

Figure 2A:
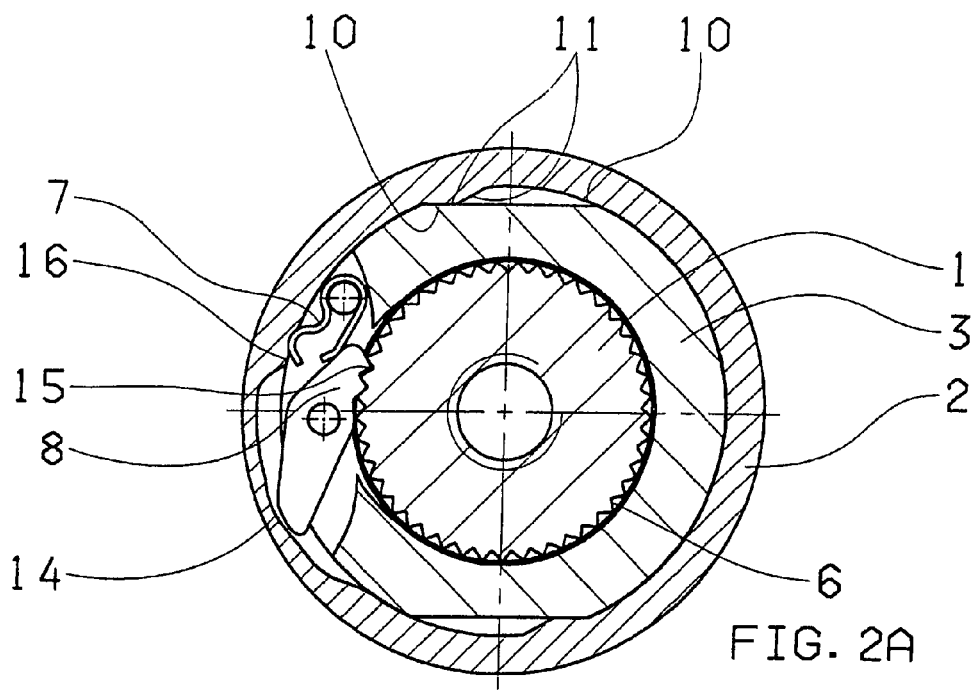
FIG. 2A is section II in the first angular position corresponding to the engaged state of the detent pawl.
Figure 2B:
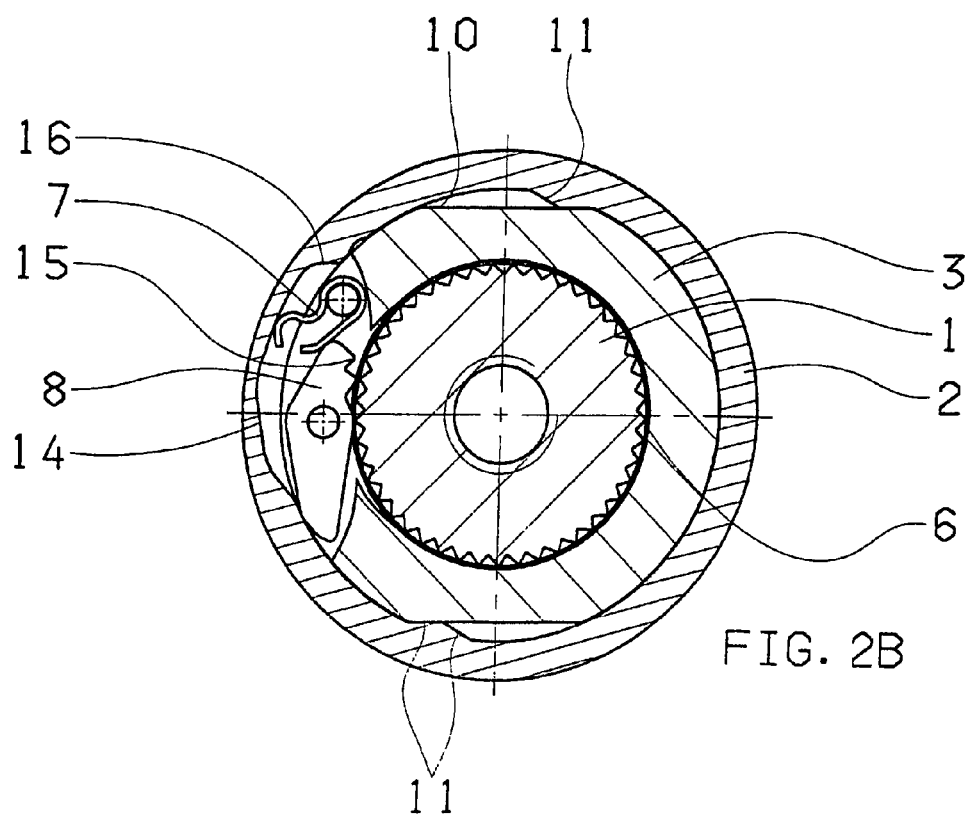
FIG. 2B is a view like FIG. 2A but in the second angular position.
Figure 3A:
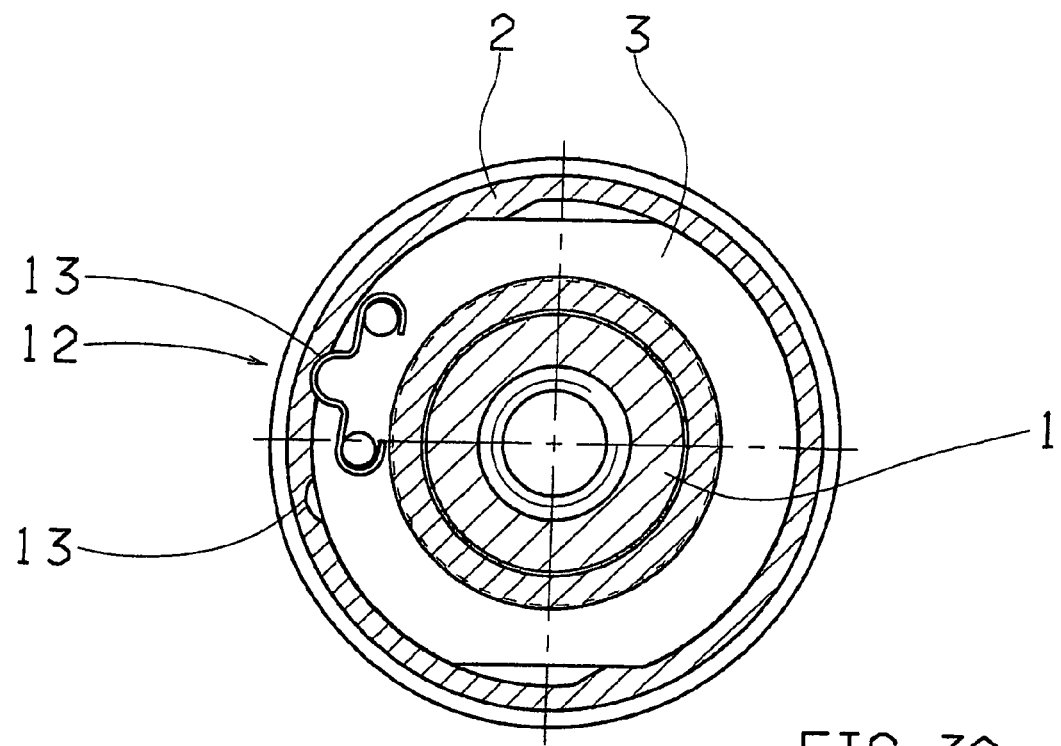
FIG. 3A is section III of FIG. 1 in the first angular position.
Figure 3B:
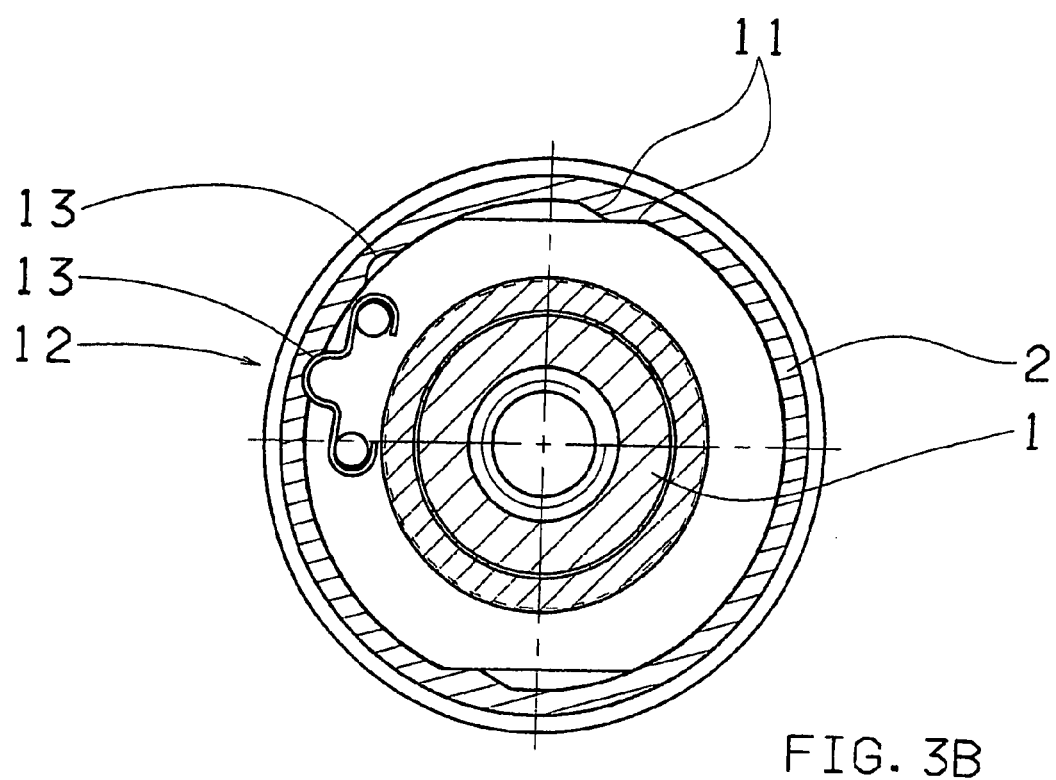
FIG. 3B is a view corresponding to FIG. 3A but in the second angular position.

FIGS. 2A and 2B show that a stop 10 is formed on the jaw holder 3 and a counterstop 11 is formed on the tightening sleeve 2 for a defined limited rotation of the tightening sleeve 2 relative to the jaw holder 3 between a first angular position (FIG. 2A) corresponding to the engaged state of the detent pawl 8 and a second angular position (FIG. 2B) corresponding to the disengaged state. Furthermore, the drill chuck also comprises a retaining device 12 shown in FIGS. 3A and 3B.

This retaining device 12 comprises a locking seat 13 associated with the first angular position and another locking seat 13 associated with the second angular position between jaw holder 3 and tightening sleeve 2, sp that the device 12 allows rotation of the tightening sleeve 2 relative jaw holder 3, at least in the rotational sense of the tightening sleeve 2 that corresponds to tightening only when a predetermined tightening force has been achieved. This happens in practice in that during tightening of the drill chuck the holding jaws 4 are pressed against the tool shaft, as a result of which further movement of the holding jaws 4 is met with greater resistance that requires the application of increased torque when rotating the tightening sleeve 2, so that in this situation the retaining device 12 [locking device 9] ensures the engaged state of detent pawl 8 into the ring of gear teeth 6 during the shifting between the second angular position and the first angular position.

In order to make possible opening of the drill chuck to change a tool, the detent pawl 8 must again be disengaged from the ring of gear teeth 6, to which end a cam 14 is provided on the tightening sleeve 2 for moving the detent pawl 8 when the tightening sleeve 2 is rotated in the rotational sense corresponding to loosening of the holding jaws 4. The cam 14 is effective when on shifting from the first angular position to the second angular position takes place again, therefore as the retaining device 12 changes locking seat 13.

FIGS. 2A and 2B show that the detent pawl 8 is made as a two-armed lever in the embodiment shown with at least a first lever arm having two locking teeth 15 and with a second lever arm for engagement with the cam 14, and that the spring 7 bears on the first lever arm. It can furthermore be gathered from FIGS. 2A and 2B that the spring 7 is pivoted by a spring cam 16 in the disengaged position of the detent pawl 8 out of the position bearing on the detent pawl 8, this being made possible by a recess in tightening sleeve 2 in an angular extension of the cam 14 and the pivoting out of the spring 7 is ensured since it tends to assume a configuration that is not stressed.

Figure 5:
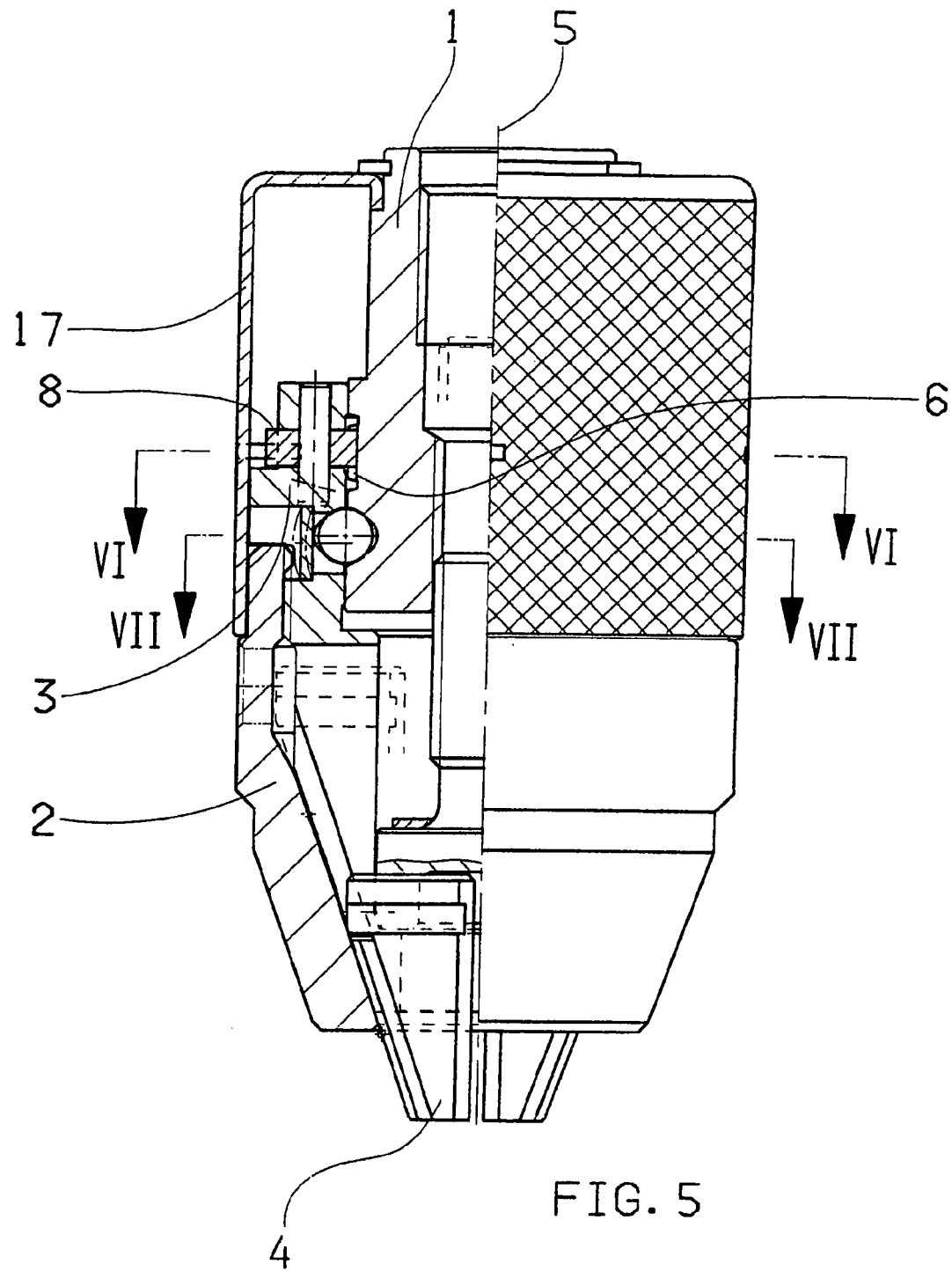
FIG. 5 is a view like FIG. 1 of a further alternative embodiment with the tightening sleeve lengthened axially toward the axial rear end of the chuck body for replacing a grip casing.

FIG. 5 shows an alternative embodiment in which tightening sleeve 2 is associated with a casing 17 extending toward the rear end of the chuck body, which casing serves to enclose the locking device 9 and retaining device 12 if no grip casing [end plate] 18 is provided mounted on the axial rear end of the chuck body 1. In this embodiment an alternative shaping of the retaining device 12 is provided made according to FIG. 6 where a substantially omega-shaped leaf spring 19 is arranged in the jaw holder 3 to cooperate with a locking bump 20. FIG. 7 shows a further alternative of the retaining device 12 in which a leaf spring 19 provided between the tightening sleeve 2 and the jaw holder is used that is fixed by an eye 21 in a radial bore of the jaw holder 3. This retaining device 12 can also be combined with the retaining devices 12 shown in other embodiments, so that as a result an increase of the release torque is possible.

Figure 8A:
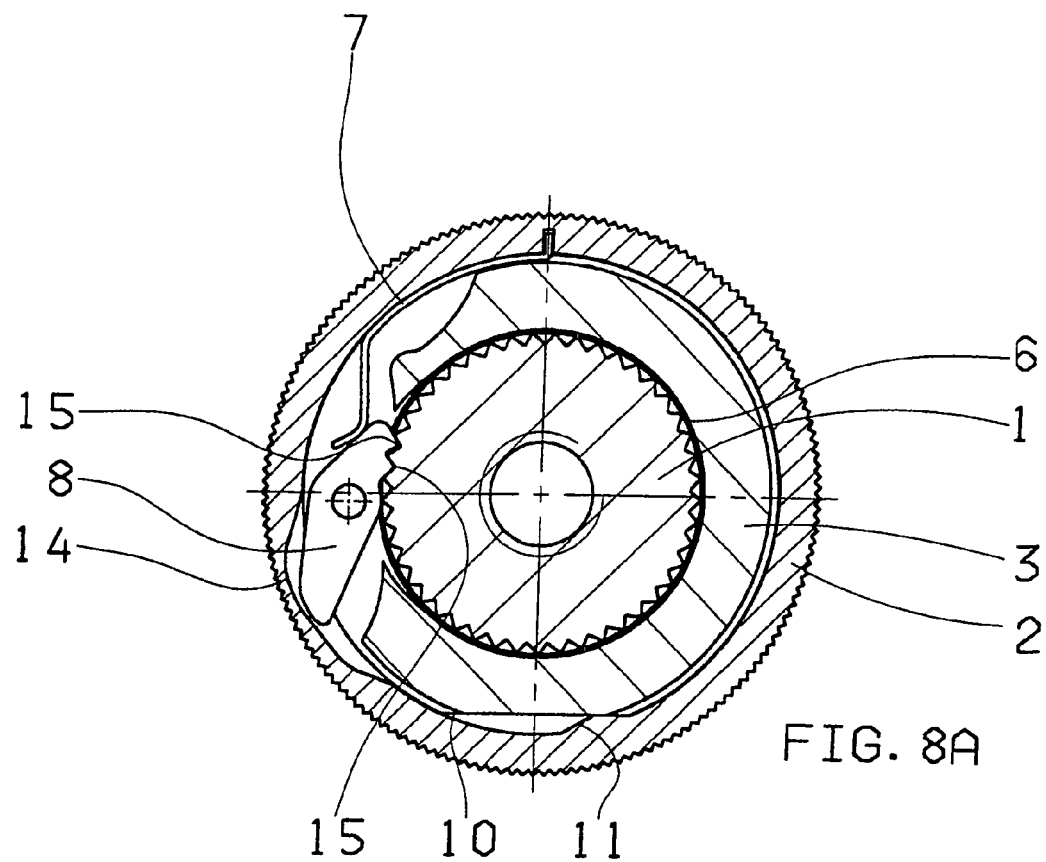
FIG. 8A is a view like FIG. 2A of an alternative embodiment with the spring mounted on the tightening sleeve.
Figure 8B:
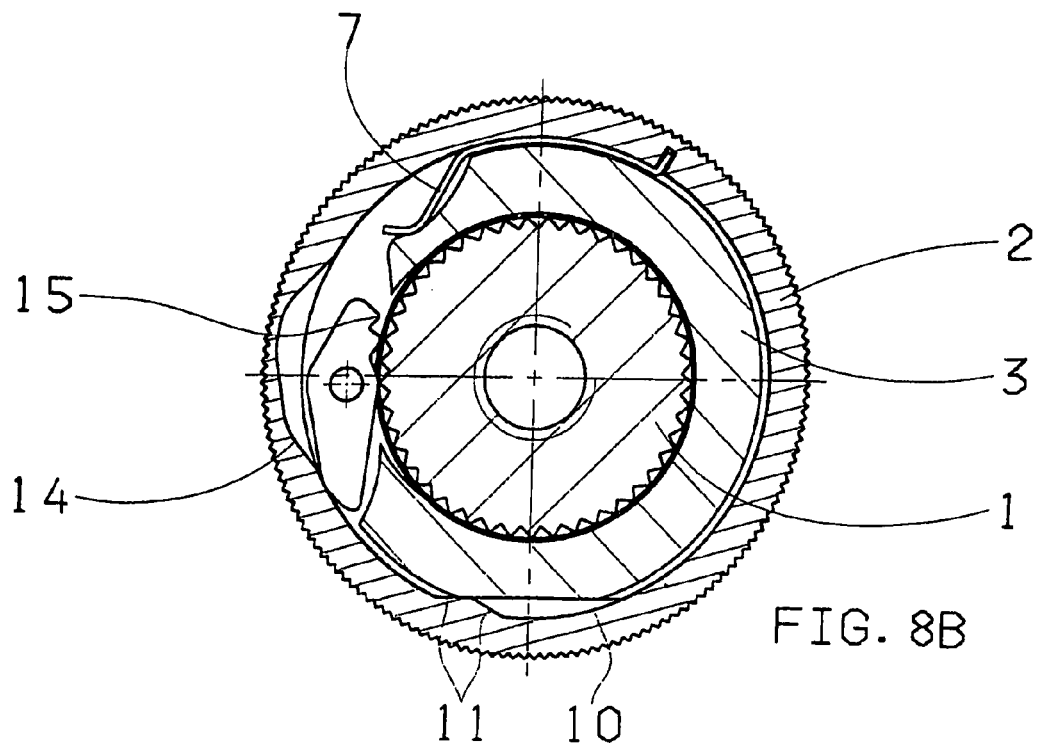
FIG. 8B is a view like FIG. 2B of the embodiment of FIG. 8A.
Figure 9A:
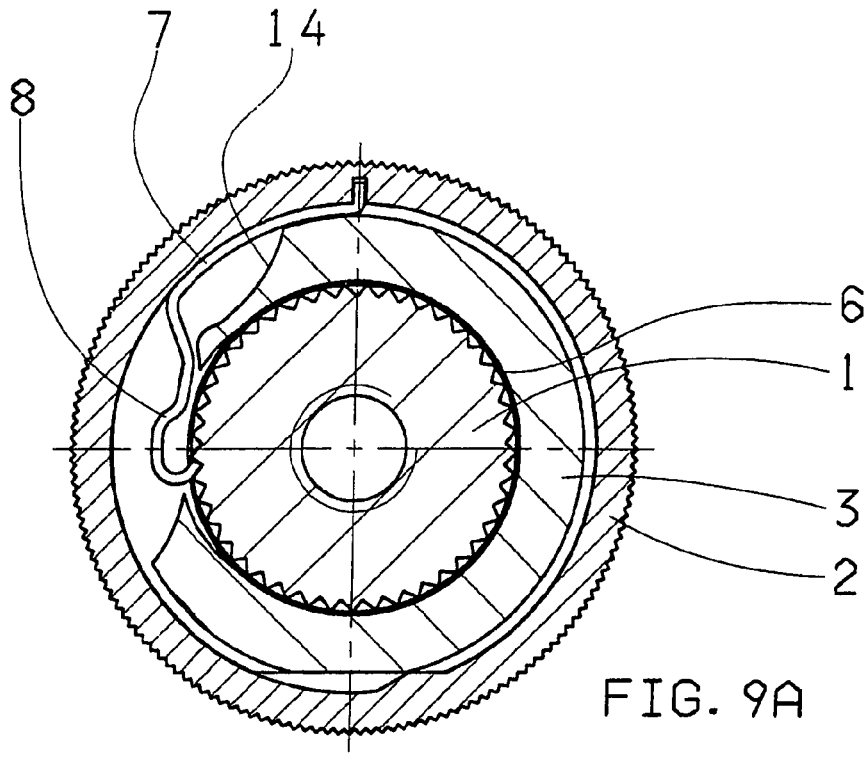
FIG. 9A is a view like FIG. 2A of a further embodiment with detent pawl and spring formed in one piece.
Figure 9B:
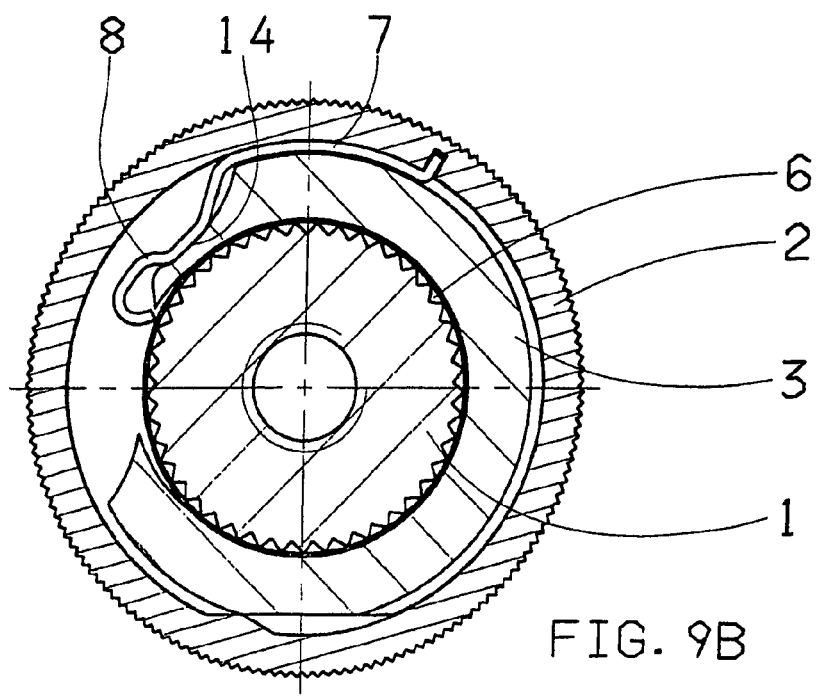
FIG. 9B is a view like FIG. 2B of the embodiment of FIG. 9A.
Figure 10:
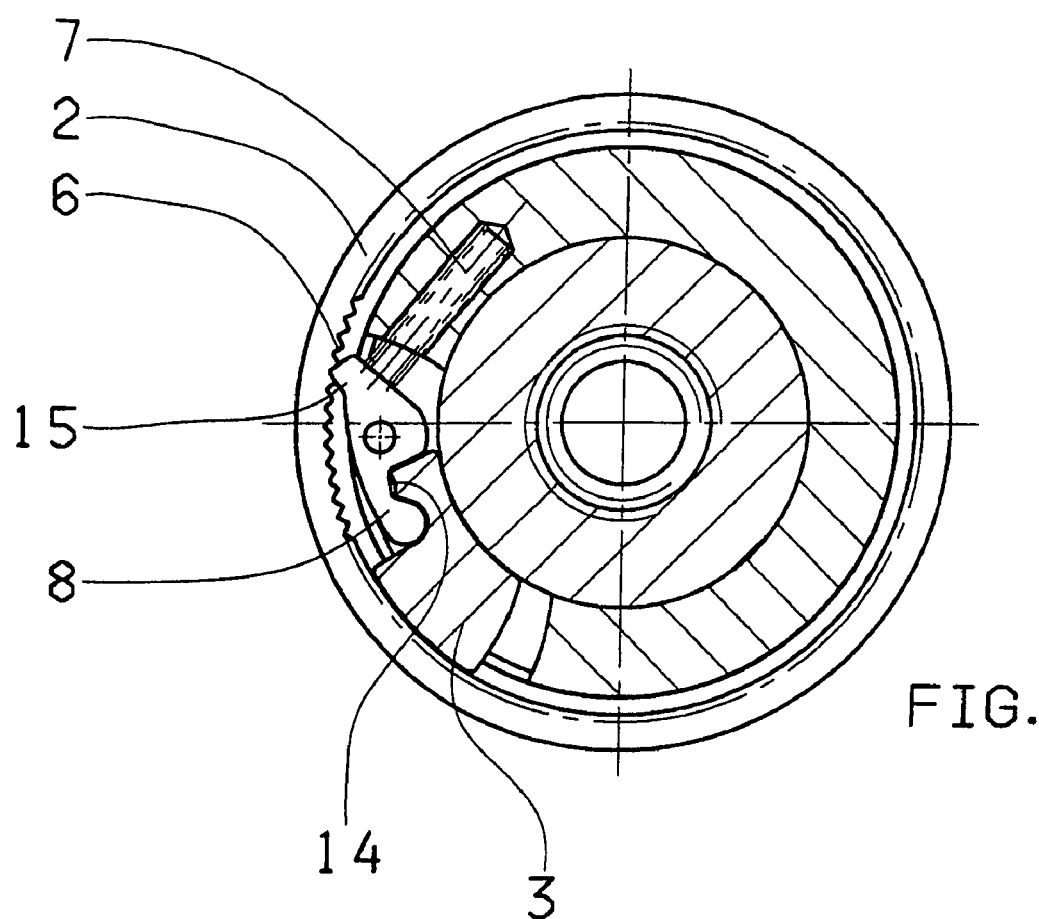
FIG. 10 is a view like FIG. 2A of an embodiment with the ring of gear teeth formed on the tightening sleeve.

FIGS. 8A and 8B show an embodiment in which the spring 7 is supported on the tightening sleeve 2, while FIGS. 9A and 9B show an embodiment in which the detent pawl 8 and the spring 7 are made in one piece and the cam 14 is provided on the jaw holder 3.

Figure 4:
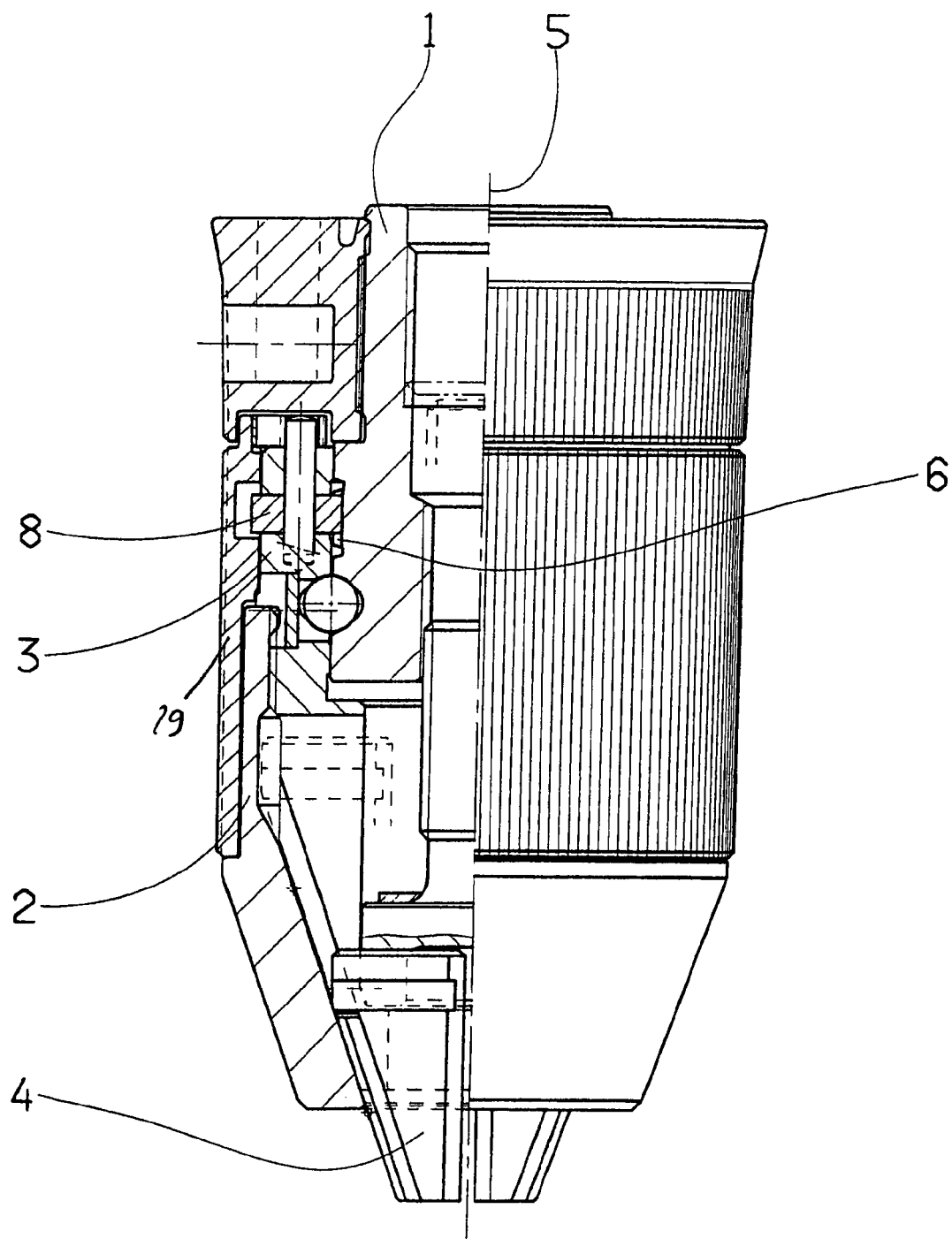
FIG. 4 is a view like FIG. 1 of an embodiment with a two-part tightening sleeve with a loosening ring longer than in FIG. 1.
Figure 12:
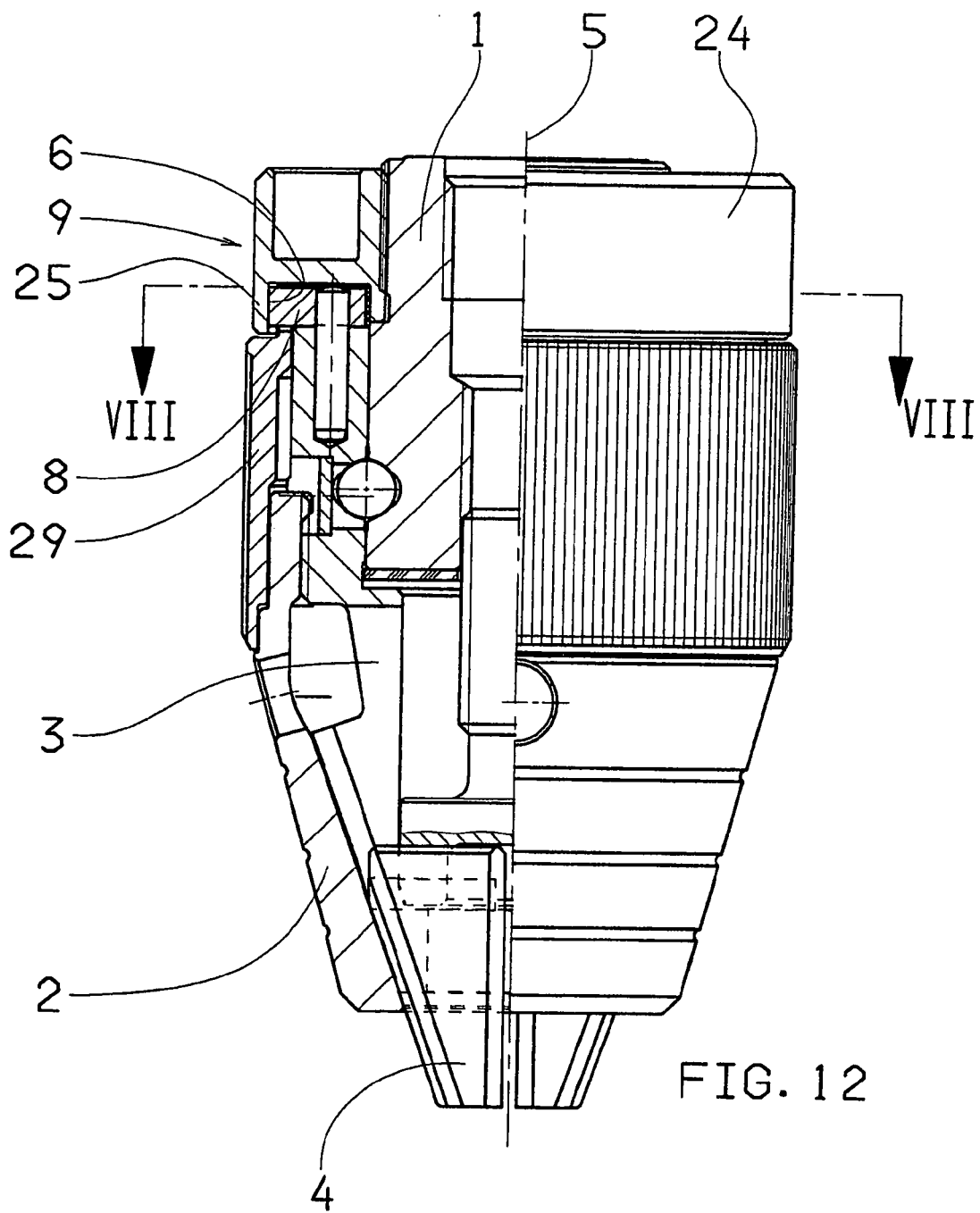
FIG. 12 is a view like FIG. 1 of an embodiment with an alternative arrangement of the ring of gear teeth.
Figure 14:
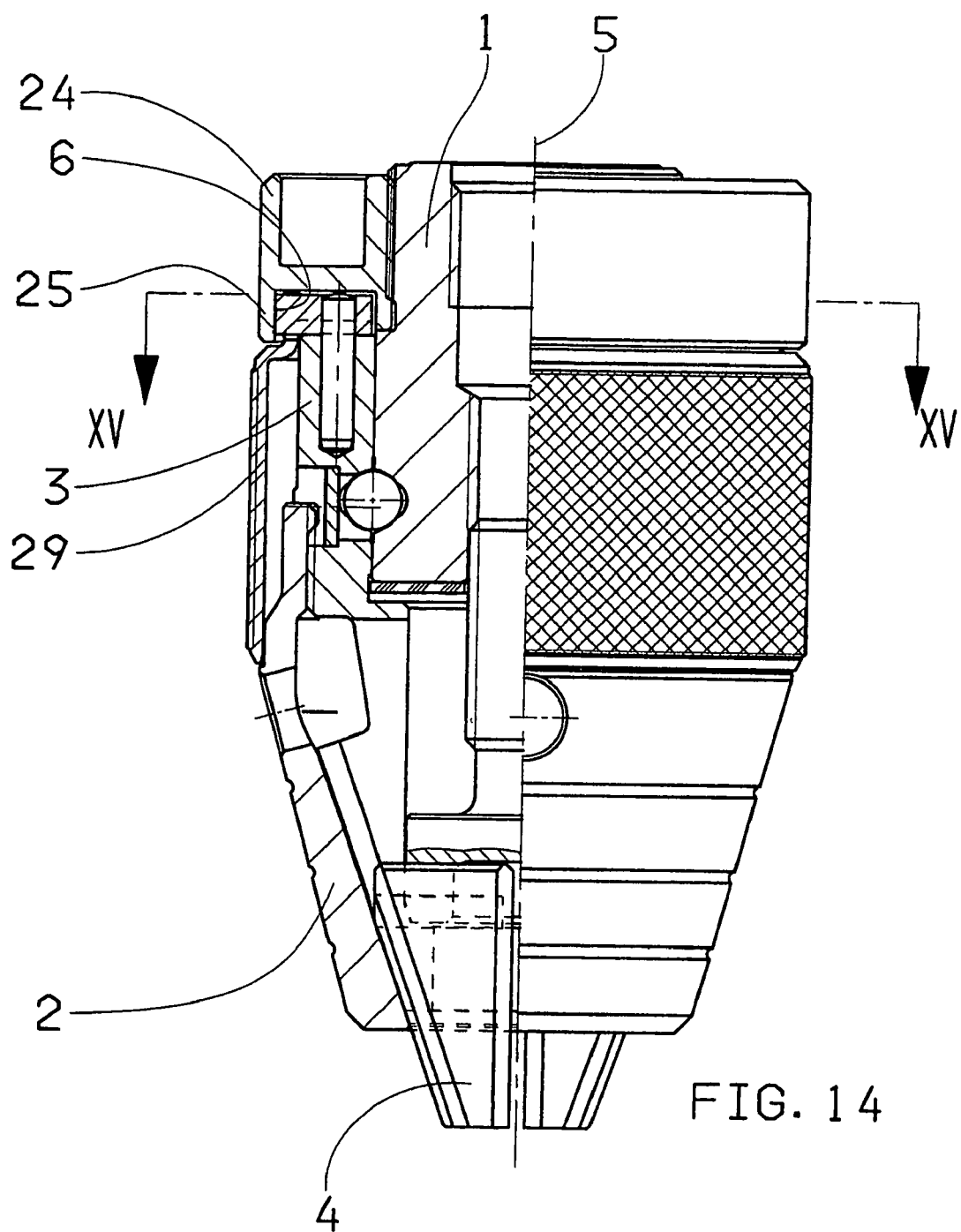
FIG. 14 is a view like FIG. 12 of an embodiment with a metallic tightening casing of the tightening sleeve.
Figure 15A:
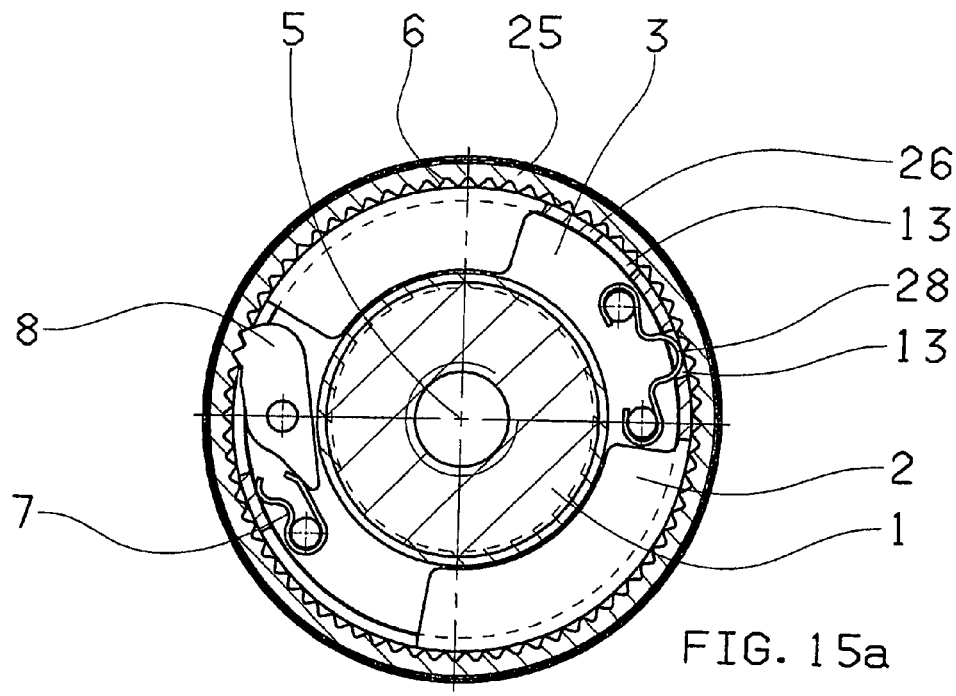
FIG. 15*a* is section XV-XV of FIG. 14 with the detent pawl in the detent position.
Figure 15B:
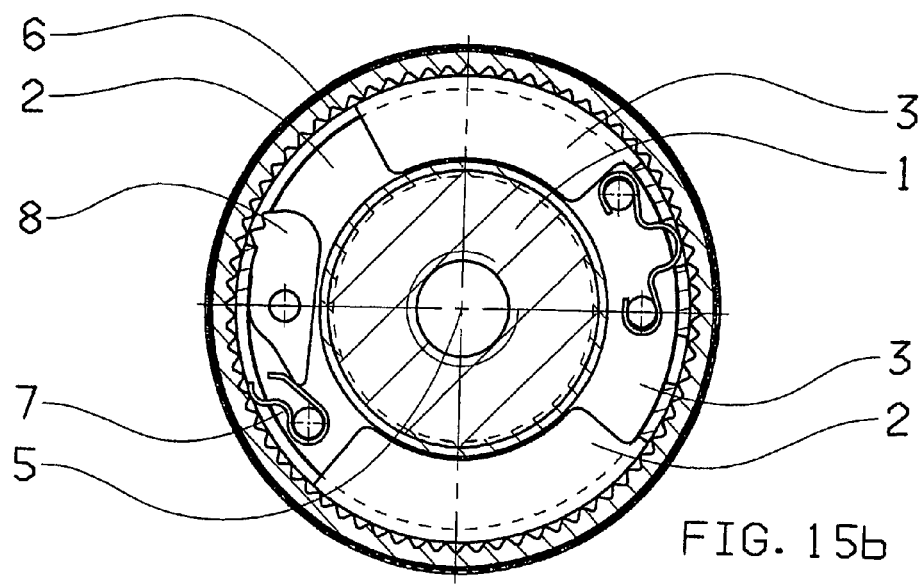
FIG. 15*b* is section XV-XV of FIG. 14 with the detent pawl in the release position.
Figure 15C:
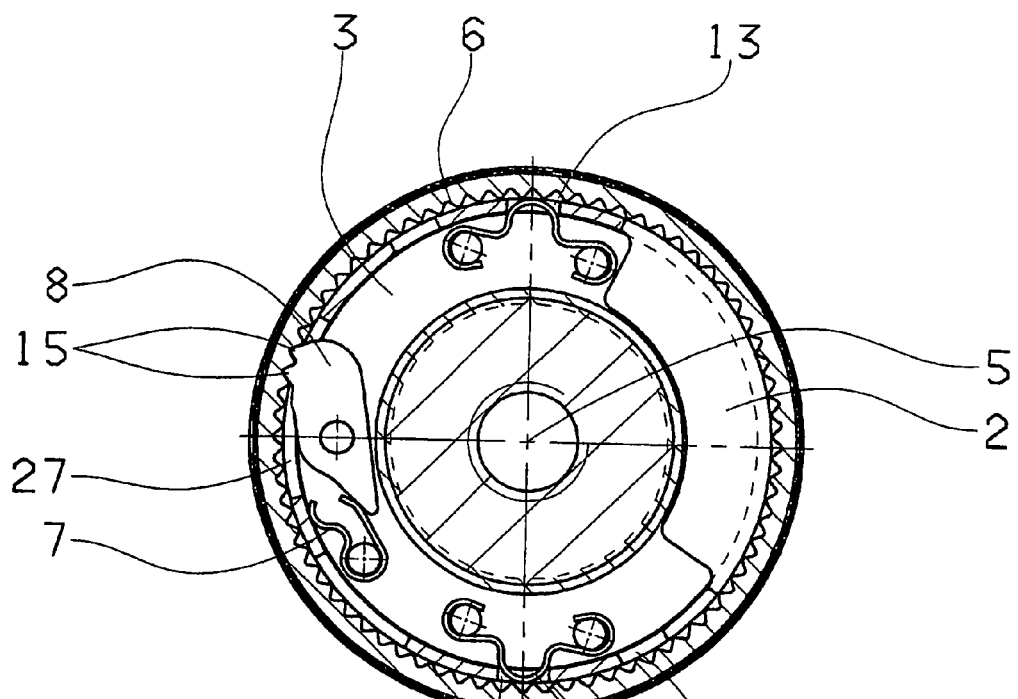
FIG. 15*c* is section XV-XV of FIG. 14 in an alternative embodiment with two locking springs and shown in the detent position.
Figure 15D:
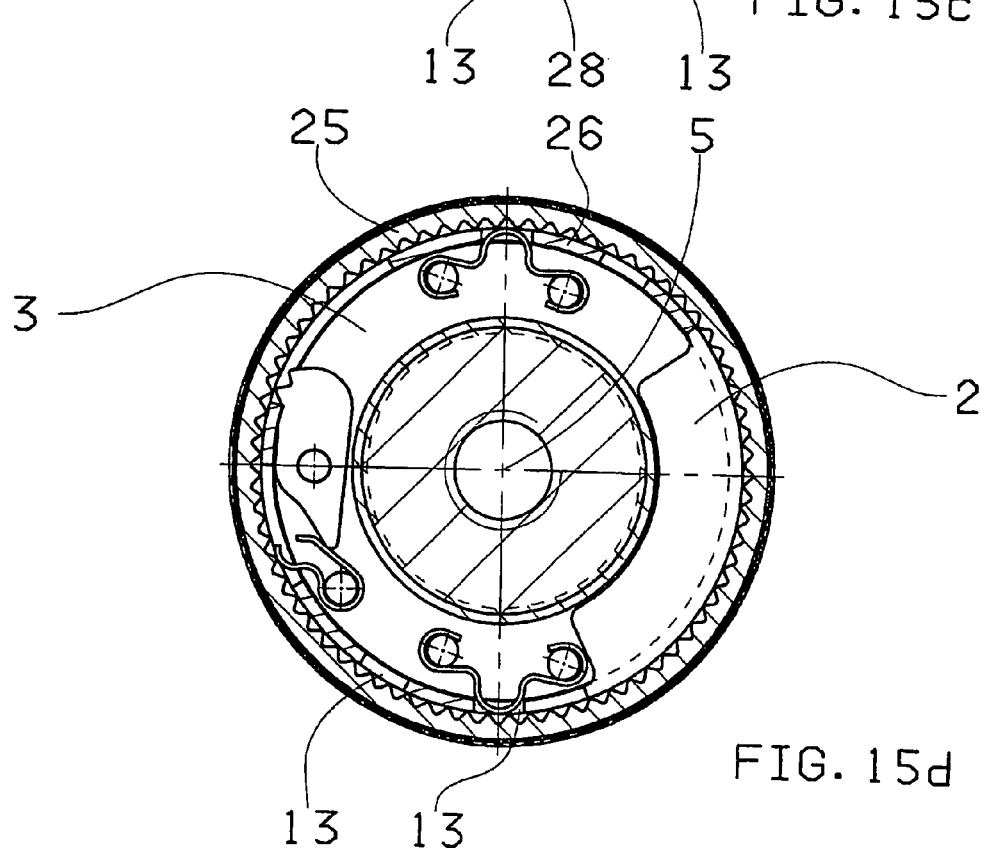
FIG. 15*d* is section XV-XV of FIG. 14 in an alternative embodiment with two locking springs and shown in the release position.

FIGS. 4, 12 and 14 show embodiments in which the tightening sleeve 2 is made in two parts with a loosening ring 29 serving to move the detent pawl 8, which ring can be economically formed from a material that can be readily processed and complexly formed, in particular a material such as a plastic that can be injection-molded, but can also be formed from metal.

These alternatives also exist for the tightening sleeve 2 as such, which tightening sleeve 2 and loosening ring 29 are positively connected angularly in a torque-transferring manner, e.g. in that a groove-key connection is formed that acts in the circumferential direction between the loosening ring and tightening sleeve 2.

Figure 11:
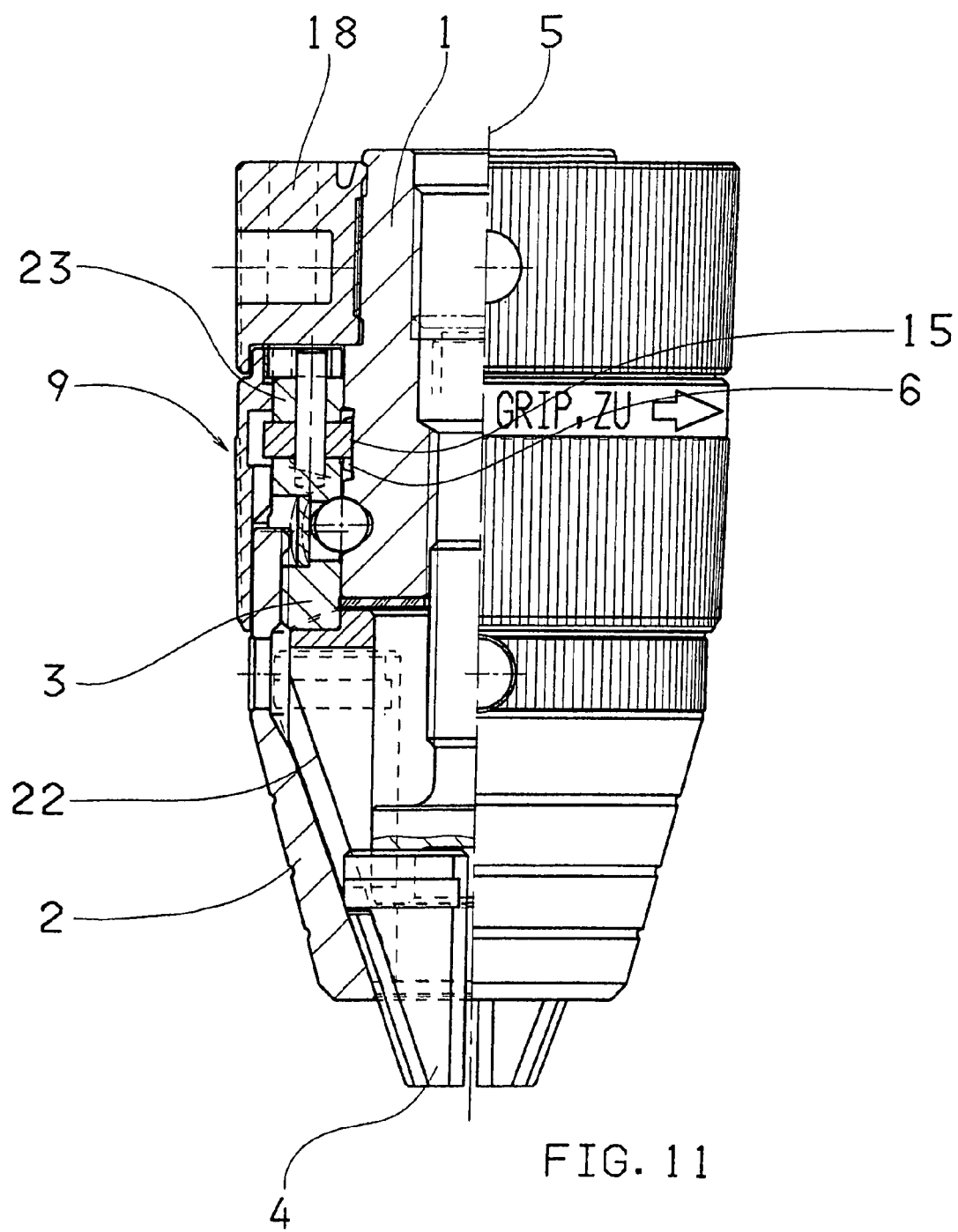
FIG. 11 is a view like FIG. 1 of an embodiment with a two-part jaw holder.

FIG. 11 shows an embodiment in which the jaw holder 3 is formed in two parts with a holding sleeve 22 having the guide slots and with a stop part 23 having the stop, which two-part design of the jaw holder 3 opens up the same possibilities as the two-part design of tightening sleeve 2, namely, as regards the selection of material or the combination of material. The holding sleeve 22 and stop part 23 are positively connected in a torque-transferring manner in that a groove-key connection acting in the circumferential direction is formed between holding sleeve 22 and stop part 23.

Figure 13A:
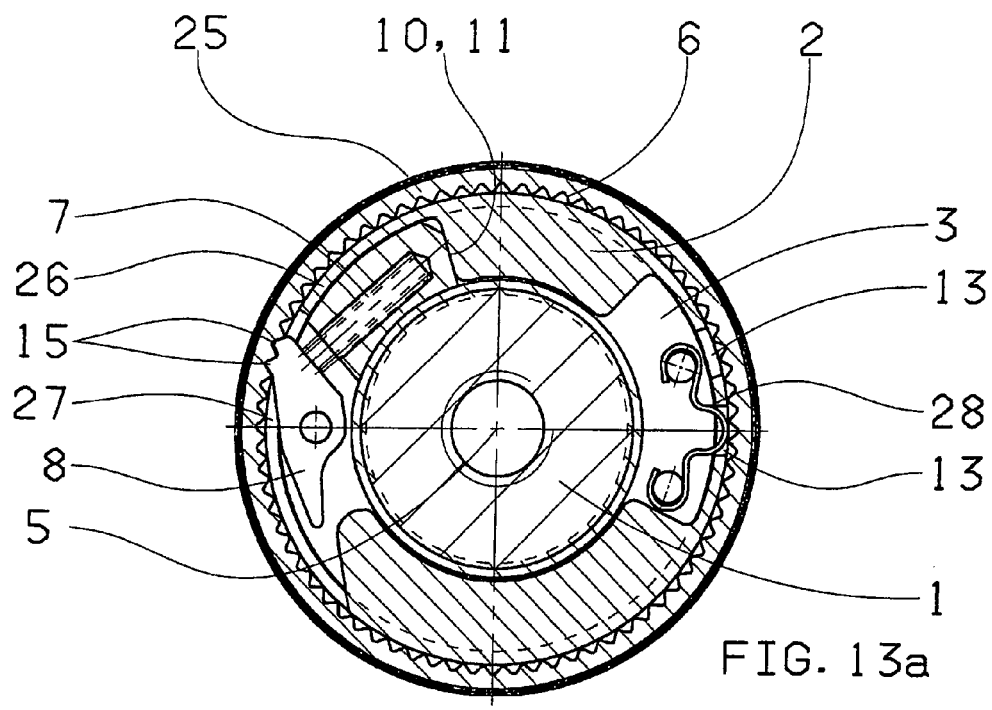
FIG. 13*a* is section XIII-XIII of FIG. 12 with the detent pawl in the detent position.
Figure 13B:
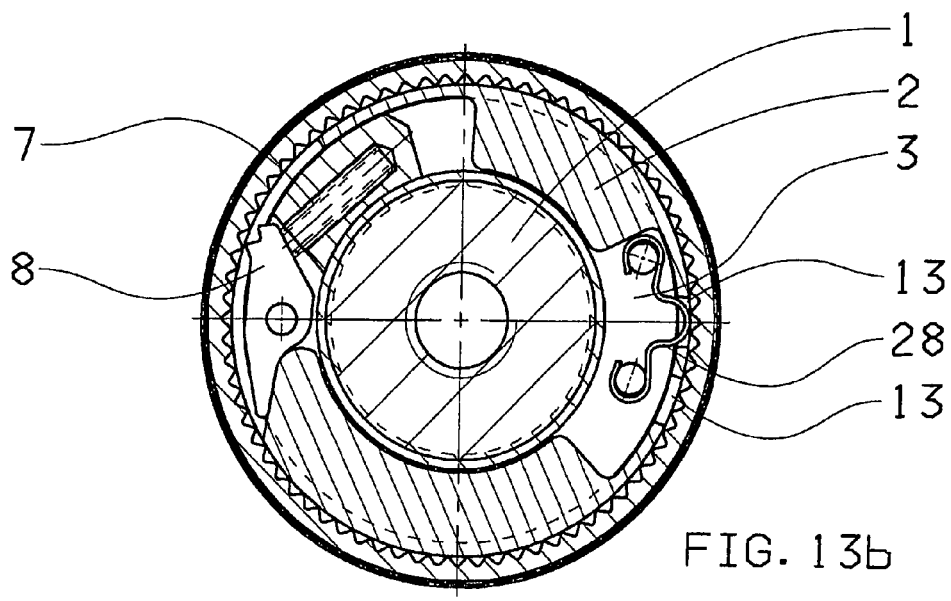
FIG. 13*b* is section XIII-XIII of FIG. 12 with the detent pawl in the release position.

Another embodiment is shown in FIGS. 12 and 13 in which a holding ring 24 is arranged on the axial rear end of the chuck body 1 facing away from the holding jaws 4 in such a manner that it us rotationally fixed on it, which ring is formed with a ring collar 25 facing axially to the front on which the ring of gear teeth 6 is formed on the inner circumferential surface. Furthermore, a conical collar 26 is provided on the axial rear end of the tightening sleeve 2, which conical collar fits inside the ring collar 25 and has a cutout 27 for the passage of the detent pawl 8 and also has the locking seats 13 of the retaining device 12.

Figure 6:
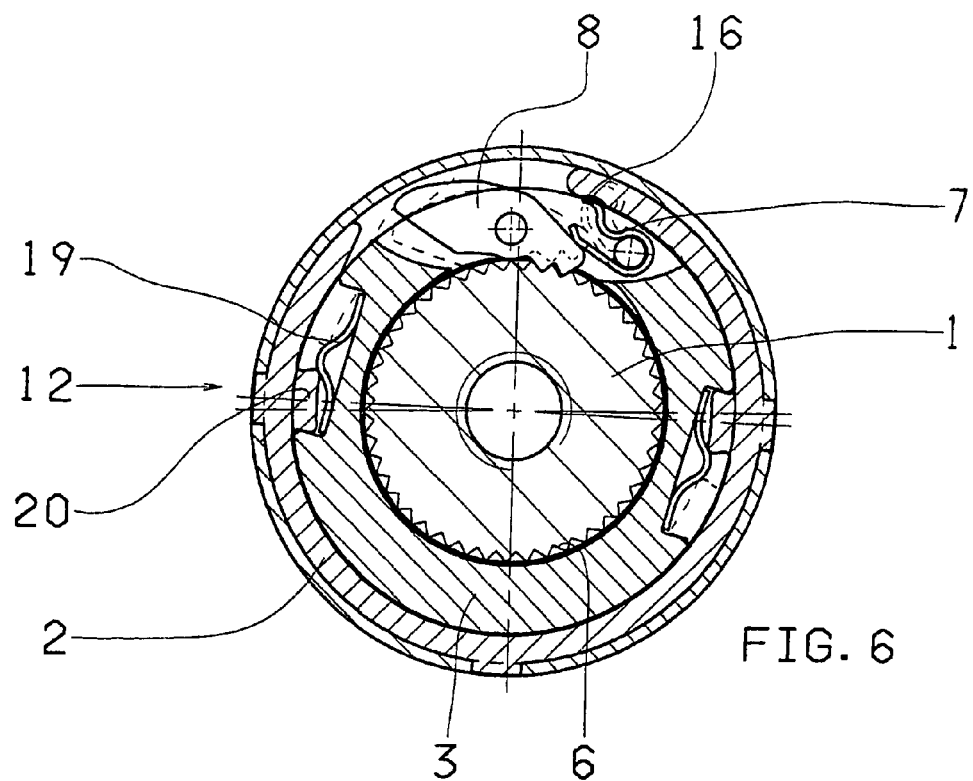
FIG. 6 is section VI-V [sic-VI?] of FIG. 5.
Figure 7:
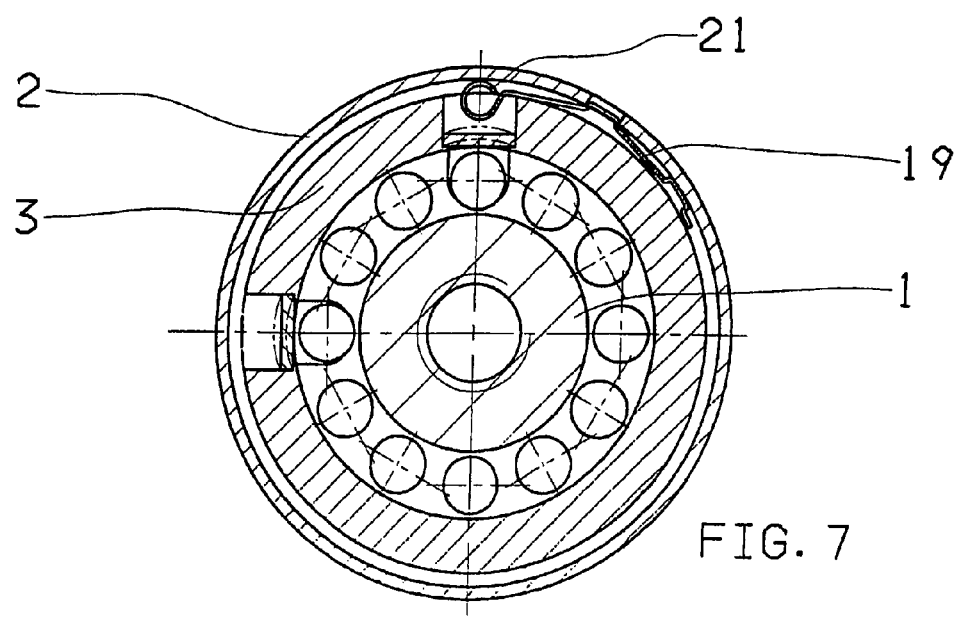
FIG. 7 is section VII-VII of FIG. 5.

The embodiments shown in the drawings have the common feature that a latch spring 28 mounted on the jaw holder 3 is associated with the retaining device 12 for pressing it into the locking seats 13, and that two such locking springs 28 are provided in the embodiments according to FIGS. 6 and 15.

The invention claimed is:

1. A drill chuck comprising:
   a chuck body centered on and rotatable about an axis;
   a holder body rotatable on the chuck body and formed with a plurality of angularly spaced guides;
   a tightening sleeve surrounding the bodies;
   respective jaws in the guides between the tightening sleeve and the chuck body;
   means for shifting the jaws in the guides forward and together on rotation of the holder body in a tightening direction relative to the chuck body and for opposite shifting of the jaws on rotation of the holder body relative to the chuck body in an opposite loosening direction;
   an annular array of teeth rotationally fixed to one of the bodies;
   a pawl angularly fixed on the other of the bodies and engageable with the teeth;
   a spring biasing the pawl into engagement with the teeth, the pawl and the array of teeth being oriented such that when the pawl is in a locking position engaged with the array of teeth the holder body can rotate relative to the chuck body in the tightening direction but not in the loosening direction and when in a freeing position disengaged from the teeth the holder body can rotate freely in either direction relative to the chuck body, the pawl and the spring being made in one piece;
   respective interengaging stops on the other body and on the tightening sleeve limiting relative angular movement of the tightening sleeve on the other body between a pair of angularly offset end positions; and
   a spring-loaded retainer having a pair of angularly offset seats engageable with the tightening sleeve and releasably holding the tightening sleeve relative to the other body in the end positions.

2. The drill chuck according to claim 1 wherein the spring is supported on the tightening sleeve.

3. The drill chuck according to claim 1 wherein the cam is associated with the holder body.

4. A drill chuck comprising:
a chuck body centered on and rotatable about an axis;
a holder body rotatable on the chuck body and formed with a plurality of angularly spaced guides;
a tightening sleeve surrounding the bodies;
respective jaws in the guides between the tightening sleeve and the chuck body;
means for shifting the jaws in the guides forward and together on rotation of the holder body in a tightening direction relative to the chuck body and for opposite shifting of the jaws on rotation of the holder body relative to the chuck body in an opposite loosening direction;
an annular array of teeth formed on the tightening sleeve;
a pawl angularly fixed on the other of the bodies and engageable with the teeth;
a spring biasing the pawl into engagement with the teeth, the pawl and the array of teeth being oriented such that when the pawl is in a locking position engaged with the array of teeth the holder body can rotate relative to the chuck body in the tightening direction but not in the loosening direction and when in a freeing position disengaged from the teeth the holder body can rotate freely in either direction relative to the chuck body;
respective interengaging stops on the other body and on the tightening sleeve limiting relative angular movement of the tightening sleeve on the other body between a pair of angularly offset end positions; and
a spring-loaded retainer having a pair of angularly offset seats engageable with the tightening sleeve and releasably holding the tightening sleeve relative to the other body in the end positions.

5. A drill chuck comprising:
a chuck body centered on and rotatable about an axis;
a holder body rotatable on the chuck body and formed with a plurality of angularly spaced guides;
a tightening sleeve surrounding the bodies;
respective jaws in the guides between the tightening sleeve and the chuck body;
means for shifting the jaws in the guides forward and together on rotation of the holder body in a tightening direction relative to the chuck body and for opposite shifting of the jaws on rotation of the holder body relative to the chuck body in an opposite loosening direction;
an annular array of teeth;
a holding ring on the axial rear end of the chuck body facing away from the jaws in such a manner that it is adapted to rotate with it in unison, the holding ring having a ring collar facing axially forward on which the array of gear teeth is formed;
a pawl angularly fixed on the other of the bodies and engageable with the teeth;
a spring biasing the pawl into engagement with the teeth, the pawl and the array of teeth being oriented such that when the pawl is in a locking position engaged with the array of teeth the holder body can rotate relative to the chuck body in the tightening direction but not in the loosening direction and when in a freeing position disengaged from the teeth the holder body can rotate freely in either direction relative to the chuck body;
respective interengaging stops on the other body and on the tightening sleeve limiting relative angular movement of the tightening sleeve on the other body between a pair of angularly offset end positions; and
a spring-loaded retainer having a pair of angularly offset seats engageable with the tightening sleeve and releasably holding the tightening sleeve relative to the other body in the end positions.

6. The drill chuck according to claim 5 wherein the array of gear teeth is formed on the inner circumferential surface of the ring collar and that a conical collar is formed on the axial rear end of the tightening sleeve, which conical collar is located inside the ring collar and has an opening so that the pawl can extend through it.

7. The drill chuck according to claim 6 wherein the conical collar is formed with the seats of the retainer.

8. A drill chuck comprising:
a chuck body centered on and rotatable about an axis;
a two-part holder body rotatable on the chuck body and having a holding sleeve formed with a plurality of angularly spaced guides and a stop part, the stop part and the holding sleeve being formed with groove-key connection that positively angularly interconnects the stop part and holding sleeve in a torque-transmitting manner;
a tightening sleeve surrounding the bodies;
respective jaws in the guides between the tightening sleeve and the chuck body;
means for shifting the jaws in the guides forward and together on rotation of the holder body in a tightening direction relative to the chuck body and for opposite shifting of the jaws on rotation of the holder body relative to the chuck body in an opposite loosening direction;
an annular array of teeth rotationally fixed to one of the bodies;
a pawl angularly fixed on the other of the bodies and engageable with the teeth;
a spring biasing the pawl into engagement with the teeth, the pawl and the array of teeth being oriented such that when the pawl is in a locking position engaged with the array of teeth the holder body can rotate relative to the chuck body in the tightening direction but not in the loosening direction and when in a freeing position disengaged from the teeth the holder body can rotate freely in either direction relative to the chuck body;
respective interengaging stops on the stop part of the holder body and on the tightening sleeve limiting relative angular movement of the tightening sleeve on the holder body between a pair of angularly offset end positions; and
a spring-loaded retainer having a pair of angularly offset seats engageable with the tightening sleeve and releasably holding the tightening sleeve relative to the other body in the end positions.

9. The drill chuck according to claim 8 wherein the tightening sleeve is formed with a cam for shifting the pawl out of the position engaged in the array of gear teeth into the disengaged position upon rotation of the tightening sleeve into the rotational sense corresponding to the loosening of the jaws.

10. The drill chuck according to claim 9 wherein the pawl is made as a two-armed lever with at least a first lever arm comprising a locking tooth and with a second lever arm for contacting the cam.

11. The drill chuck according to claim 10 wherein the spring bears on the first lever arm having the locking tooth.

12. The drill chuck according to claim 10 wherein the spring is pivoted by a spring cam in the disengaged position of the pawl out of the position bearing on it.

13. The drill chuck according to claim 8 wherein the tightening sleeve is made in two parts with a loosening ring serving to shift the pawl.

14. The drill chuck according to claim 13 wherein the loosening ring is made of metal.

15. The drill chuck according to claim 13 wherein the loosening ring is made of plastic.

16. The drill chuck according to claim 13 wherein the tightening sleeve is made of metal.

17. The drill chuck according to claim 13 wherein the tightening sleeve is made of plastic.

18. The drill chuck according to claim 13 wherein the tightening sleeve and the loosening ring are positively connected angularly in a torque-transferring manner.

19. The drill chuck according to claim 18 wherein a groove-key connection acting angularly is formed between the loosening ring and the tightening sleeve.

20. The drill chuck according to claim 8 wherein the array of gear teeth is formed on the chuck body.

21. The drill chuck according to claim 8 wherein the holding sleeve is made of plastic.

22. The drill chuck according to claim 8 wherein a locking spring arranged on the holder body is associated with the retainer for engaging into the seats.

23. The drill chuck according to claim 22 wherein there are two such springs.

* * * * *